United States Patent
Hamdoon et al.

(10) Patent No.: US 9,849,919 B2
(45) Date of Patent: Dec. 26, 2017

(54) VEHICLE ROOF STRUCTURE

(71) Applicant: Ford Global Technologies, LLC, Dearborn, MI (US)

(72) Inventors: Muhsin M. Hamdoon, Windsor (CA); Marwan Ahmad Elbkaily, Canton, MI (US); Darrin Neil Wagner, Bloomfield Hills, MI (US); Bakhtyar Baig, Canton, MI (US); Shuenn-Muh Chen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/962,088

(22) Filed: Dec. 8, 2015

(65) Prior Publication Data

US 2017/0158251 A1 Jun. 8, 2017

(51) Int. Cl.
  *B62D 27/02* (2006.01)
  *B62D 25/06* (2006.01)
  *B62D 25/04* (2006.01)
  *B62D 65/06* (2006.01)

(52) U.S. Cl.
  CPC ........... *B62D 27/023* (2013.01); *B62D 25/04* (2013.01); *B62D 25/06* (2013.01); *B62D 65/06* (2013.01)

(58) Field of Classification Search
  CPC ...... B62D 25/06; B62D 27/02; B62D 27/023; B62D 27/026
  USPC .................. 296/187.13, 190.03, 193.12, 210
  See application file for complete search history.

(56) References Cited

U.S. PATENT DOCUMENTS

| | | | |
|---|---|---|---|
| 2,122,444 A | 7/1938 | Tjaarda | |
| 4,136,985 A | 1/1979 | Taul | |
| 4,327,938 A | 5/1982 | Geissler et al. | |
| 4,695,342 A | 9/1987 | Belleau et al. | |
| 4,917,435 A | 4/1990 | Bonnett et al. | |
| 5,167,481 A | 12/1992 | Gotz | |
| 6,315,351 B1 | 11/2001 | Mondragon Sarmiento et al. | |
| 6,431,549 B1 * | 8/2002 | Hill ....................... | B05C 5/0216 156/295 |
| 7,048,082 B2 | 5/2006 | Mori et al. | |
| 7,556,116 B2 | 7/2009 | Ootani et al. | |
| 7,631,927 B2 | 12/2009 | Ayabe | |
| 7,887,086 B2 * | 2/2011 | Kalandek .............. | B60R 21/213 248/200 |
| 8,712,176 B2 | 4/2014 | Tatsuka et al. | |
| 2005/0082880 A1 * | 4/2005 | Lee ...................... | B62D 29/043 296/210 |
| 2010/0140984 A1 | 6/2010 | Murray | |
| 2010/0314911 A1 | 12/2010 | Morgans et al. | |

(Continued)

FOREIGN PATENT DOCUMENTS

| | | | |
|---|---|---|---|
| CN | 204355058 U | 5/2015 | |
| DE | 19800038 A1 | 7/1999 | |

(Continued)

*Primary Examiner* — Jason S Daniels
(74) *Attorney, Agent, or Firm* — Jason Rogers; Brooks Kushman P.C.

(57) ABSTRACT

A vehicle roof structure and door opening panel structure is disclosed that is reinforced with an upper reinforcement strip and a lower reinforcement strip. The roof panel, door opening panel and reinforcement strips are attached by an adhesive and by a plurality of fasteners. The fasteners are received in pierce nuts that are preassembled to the lower reinforcing strip.

4 Claims, 3 Drawing Sheets

(56) References Cited

U.S. PATENT DOCUMENTS

| | | |
|---|---|---|
| 2013/0028534 A1 | 1/2013 | Tatsuka et al. |
| 2014/0353350 A1 | 12/2014 | Sirrenberg et al. |
| 2015/0137563 A1* | 5/2015 | Eberle .................. B60R 9/04 |
| | | 296/215 |

FOREIGN PATENT DOCUMENTS

| | | |
|---|---|---|
| DE | 102010031774 A1 | 3/2011 |
| DE | 102011114662 A1 | 4/2013 |
| GB | 2003095 A | 3/1979 |
| JP | 5515569 A | 4/2011 |
| JP | 5238674 A | 6/2011 |
| JP | 2012104447 A | 5/2012 |

* cited by examiner

VEHICLE ROOF STRUCTURE

TECHNICAL FIELD

This disclosure relates to vehicle roof structures built to prevent separation from the door opening panel in a side impact.

BACKGROUND

Vehicles are designed with a view to reducing the mass of the vehicle but all prevailing vehicle tests must be met for a design to be acceptable. One vehicle regulation is Federal Motor Vehicle Safety Standard 214 (FMVSS 214) that is entitled the 20 MPH Oblique Pole Side Impact Test. In this test, the pole location is set in a range of locations relative to test dummies corresponding to $5^{th}$ percentile female dummies through $50^{th}$ percentile male dummies. Another test that is applicable to vehicle roof structures in the New Car Assessment Program (NCAP) test that is set up for a $5^{th}$ percentile female dummy.

The roof outer panel may separate from the supporting roof structure as a result of the test which would be an unsatisfactory result of the test unless other design countermeasures are put in place to achieve satisfactory occupant containment. This disclosure is directed to providing a roof structure that resists separation of the outer roof panel from the roof supporting structure in the 20 MPH Oblique Pole Side Impact Test.

This problem and other problems are addressed by this disclosure as summarized below.

SUMMARY

According to one aspect of this disclosure, a vehicle roof structure is disclosed that reduces roof intrusion and reduces diagonal expansion of the roof of a vehicle in an oblique pole side impact. The vehicle roof structure includes an upper strip attached to an upper surface along a side edge of a roof panel. A lower strip is attached to a lower surface along a side edge of a door opening panel. The roof panel is attached to the door opening panel by a plurality of fasteners that secure the upper strip to the lower strip through the roof panel and the door opening panel.

According to another aspect of this disclosure, a vehicle roof structure is disclosed that comprises first and second reinforcing strips attached to opposite sides of a roof panel that is assembled to a door opening panel. The first reinforcing strip is attached to an outer surface of and extends along the length of the roof panel. The second reinforcing strip is attached to an inner surface of and extends along the length of a door opening panel. Pierce nuts are attached to the second reinforcing strip and bolts are inserted through the first reinforcing strip, the roof panel and the door opening panel.

Another aspect of this disclosure is that an adhesive may be applied between the roof panel which is located below the upper strip and the door opening panel which is located above the lower strip.

The plurality of fasteners may be a plurality of bolts inserted through openings defined by the upper strip, the roof panel, and the door opening panel. The bolts may be received in pierce nuts secured to the lower strip. A plurality of washers may be received on the bolts above the upper strip. The lower strip may be attached to an inwardly extending flange of the door opening panel. The upper strip may be attached to an outwardly extending flange of the roof panel.

According to another aspect of this disclosure, a method is disclosed for assembling roof to a door opening panel to provide a more robust roof structure. The method begins by attaching several pierce nuts to an inner reinforcing strip. The inner reinforcing strip is assembled to the door opening panel. The roof is assembled to the door opening panel. An outer reinforcing strip is assembled to the outer surface of the roof. The outer reinforcing strip is fastened to the pierce nuts through the roof and the door opening panel with several fasteners.

According to other aspects of the method, the method may further comprise applying an adhesive between the roof and the door opening panel. The roof and the door opening panel may be heated in an oven to cure the adhesive.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
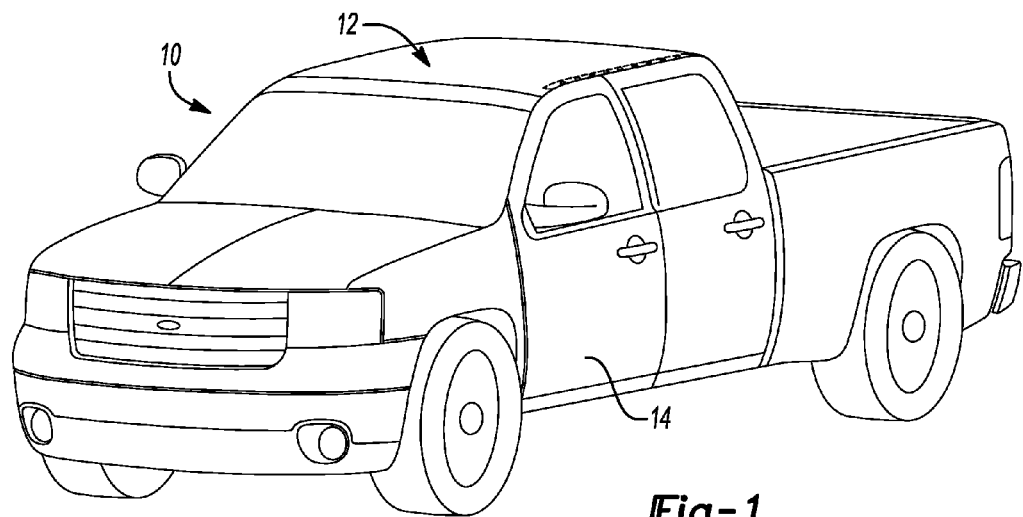
FIG. 1 is a front/left perspective view of a vehicle.

Referring to FIG. 1, a vehicle 10 is illustrated that includes a roof assembly 12 and a door 14. This disclosure relates to the reinforcement of the roof assembly 12.

Figure 2:
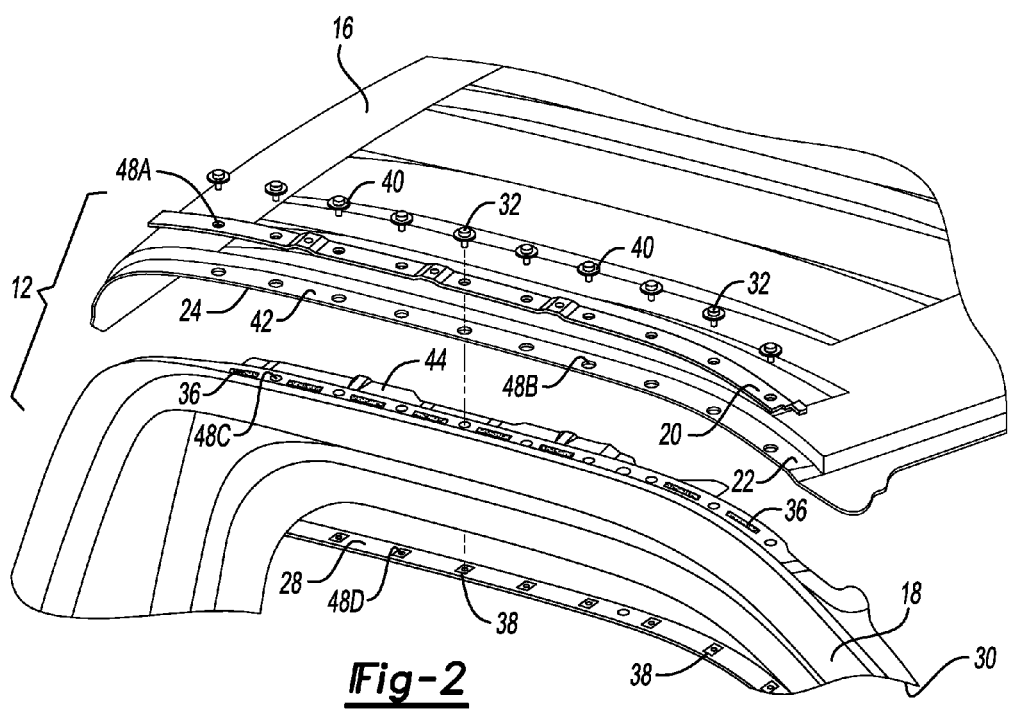
FIG. 2 is a fragmentary exploded perspective view of a door opening panel that is reinforced with an upper reinforcing strip and lower reinforcing strip according to one aspect of this invention.

Referring to FIG. 2, the roof assembly 12 is illustrated in a fragmentary perspective view to show the roof panel 16 as it is attached to a door opening panel 18. An upper reinforcing strip 20 which may comprise one or more parts is assembled to an upper surface 22 of the roof panel 16. The upper reinforcing strip 20 is attached to a side edge 24 of the roof panel 16.

A lower reinforcing strip 28 which may comprise one or more parts is attached to a lower surface of the door opening panel 18. A plurality of fasteners 32 (i.e., bolts) is used to secure the upper reinforcing strip 20, roof panel 16, door opening panel 18 and lower reinforcing strip 28 together in conjunction with an adhesive 36. The adhesive 36 is applied to the door opening panel 18 in a series of strips. It should be understood that the adhesive could alternatively be applied to the roof panel 16.

A plurality of pierce nuts 38 are shown attached to the lower reinforcing strip 28. The pierce nuts 38 are preassembled to the lower reinforcing strip 28 to facilitate receiving the fasteners 32. A washer 40 is attached to each of the fasteners 32 to provide a broader contact area with the upper reinforcing strip 20.

The door opening panel 18 includes an inwardly extending flange 44. The roof panel 16 includes an outwardly extending flange 42. The upper reinforcing strip 20 and lower reinforcing strip 28 engage the outwardly extending flange 42 of the roof panel 16 and inwardly extending flange 44 of the door opening panel 18, respectively.

Openings 48 are provided through the roof assembly 12 that are adapted to receive the fasteners 32. An opening 48A is defined by the upper reinforcing strip 20 that may comprise one or more parts. Openings 48B are provided in the outwardly extending flange 42 of the roof panel 16. Holes 48C are provided in the inwardly extending flange 44 of the door opening panel 18. Openings 48D are provided in the lower reinforcing strip 28. The openings 48D in the lower reinforcing strip 28 are partially filled by the pierce nuts 38 that are disposed in the openings 48D. The fasteners 32 are inserted through the openings 48A-D with the fastener being secured to the threaded opening defined by the pierce nuts 38.

Figure 3:
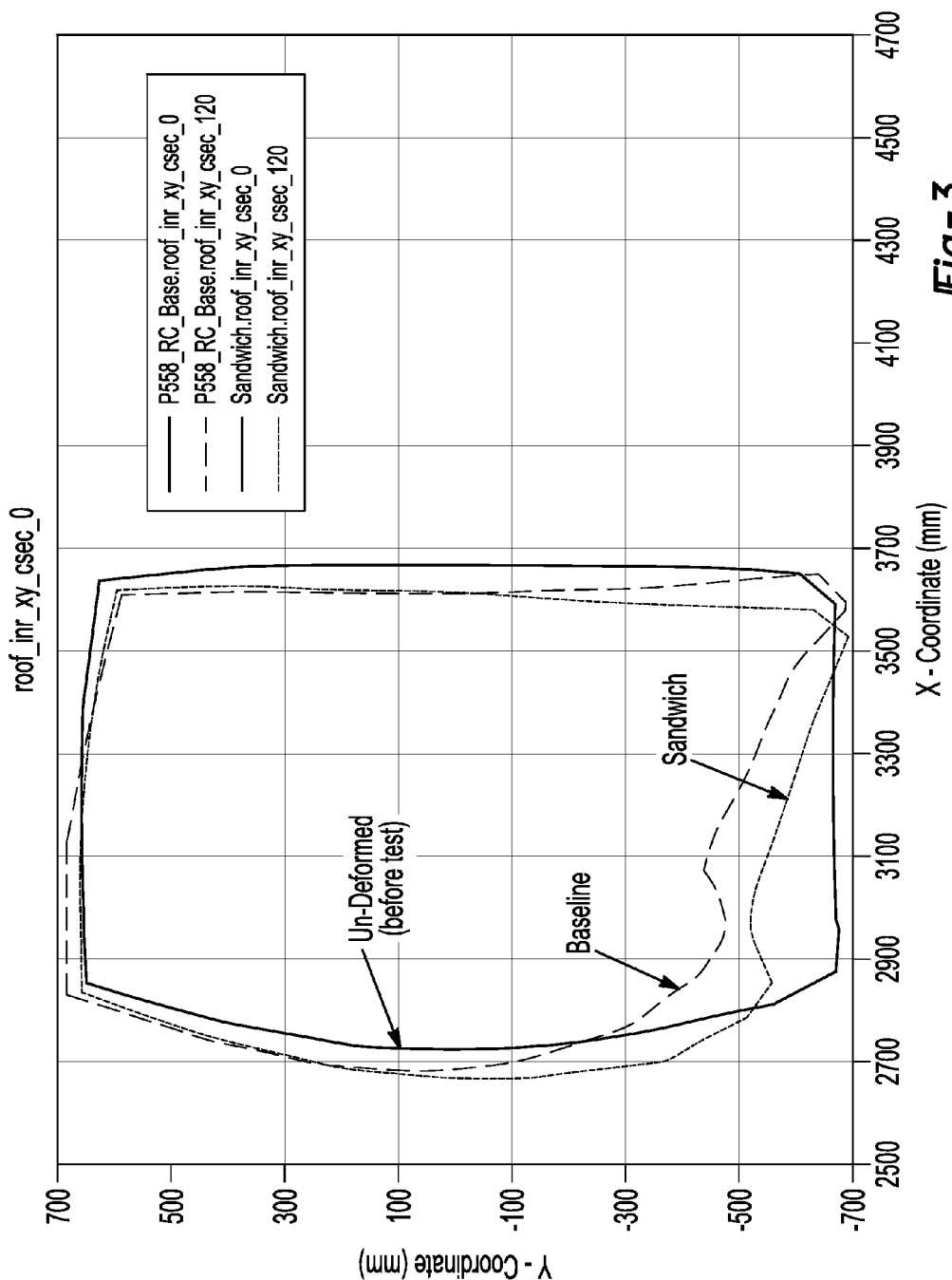
FIG. 3 is a roof intrusion diagram after an oblique pole side impact comparing the sandwich reinforcement structure of this disclosure with a baseline roof structure.

Referring to FIG. 3, the outline of a roof assembly is shown undeformed before a 20 MPH Oblique Pole Side Impact Test Impact by the solid line in FIG. 3. Intrusion caused by a side impact is illustrated for a baseline roof and a roof being provided with the disclosed sandwich reinforcement structure. The baseline is illustrated by the longer dashed line and shows intrusion at 120 milli-seconds with a maximum intrusion of approximately 200 mm at x-coordinate of about the 3100 mm. In contrast, the maximum intrusion for the sandwiched reinforced roof structure is approximately 160 mm. The difference in roof intrusion between the baseline design and the sandwich structure design is about 40 mm.

Figure 4:
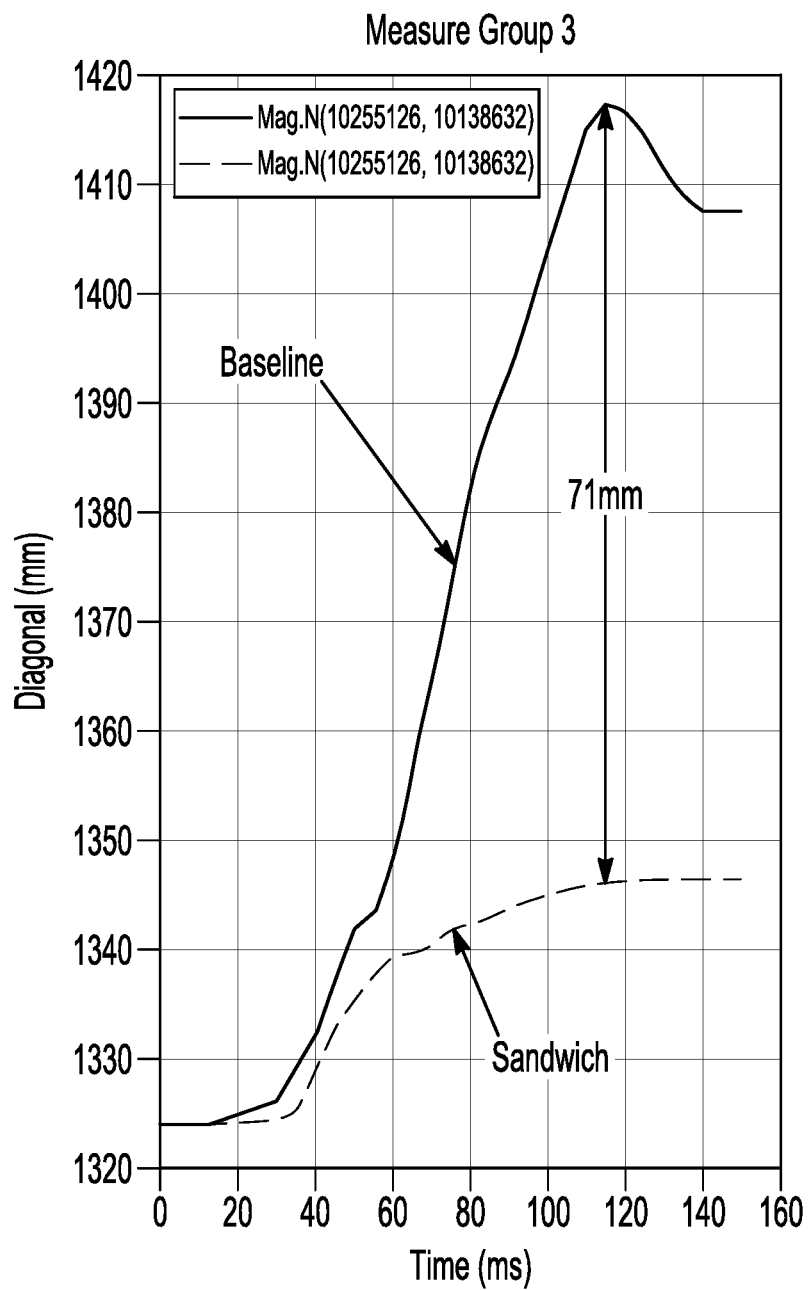
FIG. 4 is a diagram of the diagonal extension of the roof following an oblique pole side impact corresponding to the roof intrusion diagram shown in FIG. 3.

Referring to FIG. 4, a diagram of the difference in diagonal extension of the roof in a baseline side impact is compared to a sandwich reinforcement structure in the 20 MPH Oblique Pole Side Impact Test. The difference in the diagonal extension between the baseline roof structure and the sandwich reinforced roof structure is shown to be 71 mm. The baseline roof structure is diagonally elongated to about 1420 mm, while the diagonal elongation for the sandwich reinforced roof structure is about 1350 mm.

As a result of the intrusion shown in FIG. 3 and the diagonal elongation of the roof structures shown in FIG. 4, the baseline roof panel 16 separated from the door opening panel 18 in the side impact. With the sandwich reinforced roof structure disclosed herein, the extent of deformation and diagonal elongation was insufficient to cause roof separation and the sandwich reinforced roof structure yielded an acceptable result in the side impact test.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of assembling a roof to a door opening panel comprising:
   attaching several pierce nuts to an inner reinforcing strip;
   assembling the inner reinforcing strip including pierce nuts to the door opening panel;
   assembling the roof to the door opening panel;
   assembling an outer reinforcing strip to an outer surface of the roof; and
   fastening the outer reinforcing strip to the pierce nuts through the roof and the door opening panel with several fasteners.

2. The method of claim 1 further comprising:
   applying an adhesive between the roof and the door opening panel.

3. The method of claim 2 further comprising:
   heating the roof and the door opening panel in an oven to cure the adhesive.

4. The method of claim 1 further comprising assembling a washer to each of the fasteners before fastening the outer reinforcing strip to the pierce nuts.

\* \* \* \* \*